United States Patent
Marx et al.

(10) Patent No.: US 8,585,121 B2
(45) Date of Patent: Nov. 19, 2013

(54) DEVICE FOR FASTENING A VEHICLE INTERIOR TRIM PANEL

(75) Inventors: Oliver Marx, Schallodenbach (DE); Martin Schmidt, Rockenhausen (DE)

(73) Assignee: TRW Automotive Electronics & Components GmbH, Radolfzell (DE)

(*) Notice: Subject to any disclaimer, the term of this patent is extended or adjusted under 35 U.S.C. 154(b) by 22 days.

(21) Appl. No.: 13/131,654

(22) PCT Filed: Dec. 8, 2009

(86) PCT No.: PCT/EP2009/008763
§ 371 (c)(1),
(2), (4) Date: Aug. 19, 2011

(87) PCT Pub. No.: WO2010/066404
PCT Pub. Date: Jun. 17, 2010

(65) Prior Publication Data
US 2011/0302765 A1 Dec. 15, 2011

(30) Foreign Application Priority Data
Dec. 11, 2008 (DE) .................. 10 2008 061 613

(51) Int. Cl.
*B60J 5/00* (2006.01)
(52) U.S. Cl.
USPC .............................. 296/146.7; 24/289; 24/297
(58) Field of Classification Search
USPC ................................ 296/146.7; 24/289–297
See application file for complete search history.

(56) References Cited

U.S. PATENT DOCUMENTS

| | | | | | |
|---|---|---|---|---|---|
| 4,403,377 | A | * | 9/1983 | Mizusawa | 24/681 |
| 4,422,222 | A | * | 12/1983 | Notoya | 24/614 |
| 4,470,178 | A | * | 9/1984 | Matsui | 24/289 |
| 4,506,419 | A | * | 3/1985 | Mitomi | 24/297 |
| 5,577,301 | A | * | 11/1996 | De Maagd | 24/295 |
| 7,546,661 | B2 | * | 6/2009 | Connor, Jr. | 16/4 |
| 7,904,994 | B2 | * | 3/2011 | Girodo et al. | 24/297 |
| 8,375,514 | B2 | * | 2/2013 | Dendo | 16/4 |
| 2004/0016088 | A1 | * | 1/2004 | Angellotti | 24/297 |
| 2006/0017306 | A1 | * | 1/2006 | Smith et al. | 296/146.7 |
| 2006/0214468 | A1 | | 9/2006 | Cass et al. | |
| 2008/0219758 | A1 | | 9/2008 | Jatzke | |
| 2010/0019534 | A1 | * | 1/2010 | Lipski | 296/146.7 |
| 2011/0113598 | A1 | | 5/2011 | Hofmann et al. | |
| 2012/0261942 | A1 | * | 10/2012 | Benedetti | 296/146.7 |

FOREIGN PATENT DOCUMENTS

| | | |
|---|---|---|
| CN | 101270770 | 9/2008 |
| DE | 10 2006 013 507 | 10/2006 |
| DE | 10 2006 057 890 | 6/2008 |
| DE | 20 2008 006 958 | 11/2008 |
| EP | 0 020 308 | 12/1980 |
| WO | 2009/141138 | 11/2009 |

* cited by examiner

*Primary Examiner* — Lori Lyjak
(74) *Attorney, Agent, or Firm* — Tarolli, Sundheim, Covell & Tummino LLP

(57) ABSTRACT

A device (20) for fastening a vehicle inner lining (14) to a lining support (12) includes a holding element (22) and a receiving element (24). The receiving element (24) has a latching portion (26) that is laterally open and into which the holding element (22) can engage such that it is fastened to the receiving element (24) in the axial direction. Furthermore, the invention also relates to a method of mounting and demounting the vehicle inner lining (14) to or from the lining support (12) by means of this device (20).

16 Claims, 7 Drawing Sheets

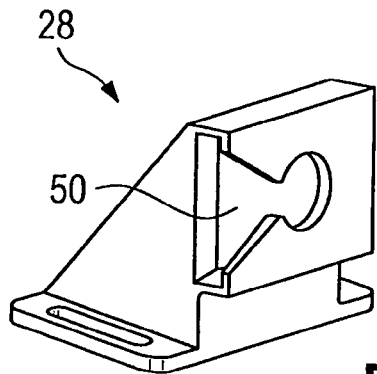
Fig. 3
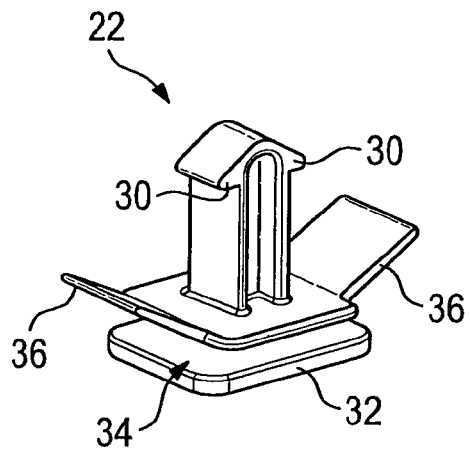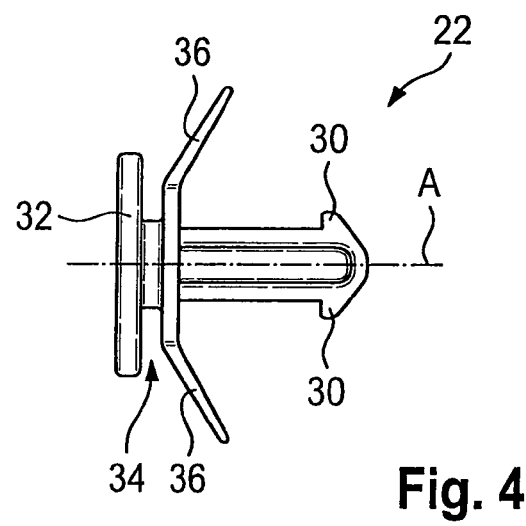
Fig. 4
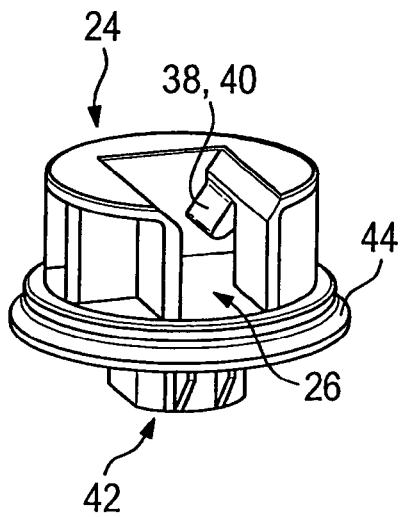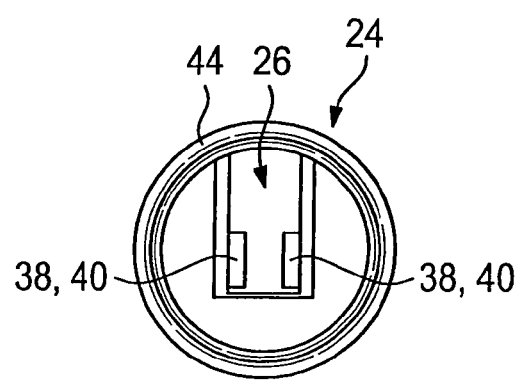
Fig. 5

DEVICE FOR FASTENING A VEHICLE INTERIOR TRIM PANEL

RELATED APPLICATIONS

This application corresponds to PCT/EP2009/008763, filed Dec. 8, 2009, which claims the benefit of German Application No. 10 2008 061 613.3, filed Dec. 11, 2008, the subject matter, of which is incorporated herein by reference in their entirety.

BACKGROUND OF THE INVENTION

The invention relates to a device for fastening a vehicle inner lining to a lining support, having a holding element and a receiving element, the receiving element having a latching portion into which the holding element can engage such that it is fastened to the receiving element in an axial direction.

Nowadays, motor vehicle bodies including present body attachment parts are lined for optical and technical reasons. Vehicle doors therefore include, for example, a lining support and an interior door lining, i.e. a door lining facing the vehicle interior, which is fastened to the lining support. The lining support and the door lining usually include a plurality of latching elements cooperating with each other when the door lining is mounted such that the door lining can be clipped on the lining support.

If an axis is defined perpendicularly to the door plane, the mounting of the door lining is carried out in the axial direction. Since the mounting is realized manually, the force for clipping in the latching elements must not be too large. However, at the same time, the latching connection should ensure that a receiving space between the door lining and the lining support for door locking elements, power windows, ventilation components or the like is protected against an ingress of water and dust. Furthermore, the door lining should not be detached from the lining support even if a vehicle occupant does not close the vehicle door in the usual way, namely by means of the door handle, but uses, for example, a storage compartment provided in the door lining for closing the vehicle door.

Furthermore, the vehicle inner lining should permit a repeated mounting and demounting so that, e.g., maintenance or repair works can be effected in the receiving space between the lining support and the vehicle inner lining. Contrary to the requirements specified above, a latching connection would be desirable in this case, which can be released as easily as possible.

Moreover, conventional latching connections have the problem that after a repeated mounting and demounting, due to the wear of the latching elements, the vehicle inner lining can no longer be fastened such that a predefined axial tensile force on the vehicle inner lining can be absorbed by the latching elements.

It is therefore usual to secure the latching connection between the lining support and the vehicle inner lining by means of a screw which constitutes an increased mounting and demounting expenditure. The screw is furthermore screwed through the vehicle inner lining into the lining support and is therefore visible in the vehicle interior or has to be covered by a cover.

SUMMARY OF THE INVENTION

The object of the invention is to provide a fastening device for a vehicle inner lining which has a high resistance to a detachment of the fastening in case of usual stress and permits at the same time a simple mounting and demounting of the vehicle inner lining.

According to the invention, the object is achieved by a fastening device of the type initially mentioned, in which the latching portion is open laterally. As a consequence of this laterally open latching portion, there is the possibility upon demounting the vehicle inner lining to release the latching connection laterally, i.e. obliquely with respect to the axial mounting direction and the usual stress direction, rather than parallel thereto. Accordingly, the latching connection can be configured for a larger axial extracting force since it is no longer necessary to overcome the latter upon demounting. The material wear on the latching portion and on the holding element is furthermore so low in such a demounting procedure that even in case of a repeated mounting and demounting of the vehicle inner lining, an almost unchanged axial extraction resistance of the fastening device is maintained.

In a preferred embodiment, the holding element can be shifted laterally in the latching portion such that it can move laterally out of the latching portion, in particular in a radial direction with respect to the axial direction.

The invention also comprises a method of mounting and demounting a vehicle inner lining to or from a lining support by means of a device having a holding element associated with the vehicle inner lining and a receiving element associated with the lining support, the holding element being pressed axially into the receiving element during mounting, and the holding element being shifted in a lateral, in particular in a radial direction with respect to the axial direction during demounting, the holding element being thus detached from the receiving element. This method permits a mounting of the vehicle inner lining in the axial direction by means of at least one fastening device according to the invention and, if necessary, further conventional fastening devices. The resulting latching connection of the fastening device according to the invention can form a particularly high axial extraction resistance during mounting since upon demounting, the latching connection is released by a movement in the lateral, preferably in the radial direction, rather than in the axial direction. Accordingly, a separate locking screw for increasing the axial extraction resistance is no longer necessary. Furthermore, the demounting is in particular a careful demounting with regard to the material wear such that the fastening device has an almost unchanged axial extraction resistance and a good sealing between the vehicle inner lining and the lining support against water and dust, even after a repeated mounting and demounting.

Suitable configurations of the invention and advantages thereof will be apparent from the dependent claims.

BRIEF DESCRIPTION OF THE DRAWINGS

The invention is described below with reference to a preferred embodiment which is illustrated in the accompanying drawings, in which:

FIG. 3 shows the perspective view of a fastening part for the fastening device according to the invention;

FIG. 4 shows views of a holding element of the fastening device according to the invention;

FIG. 5 shows views of a receiving element of the fastening device according to the invention;

DESCRIPTION OF EXEMPLARY EMBODIMENTS

Figure 1:
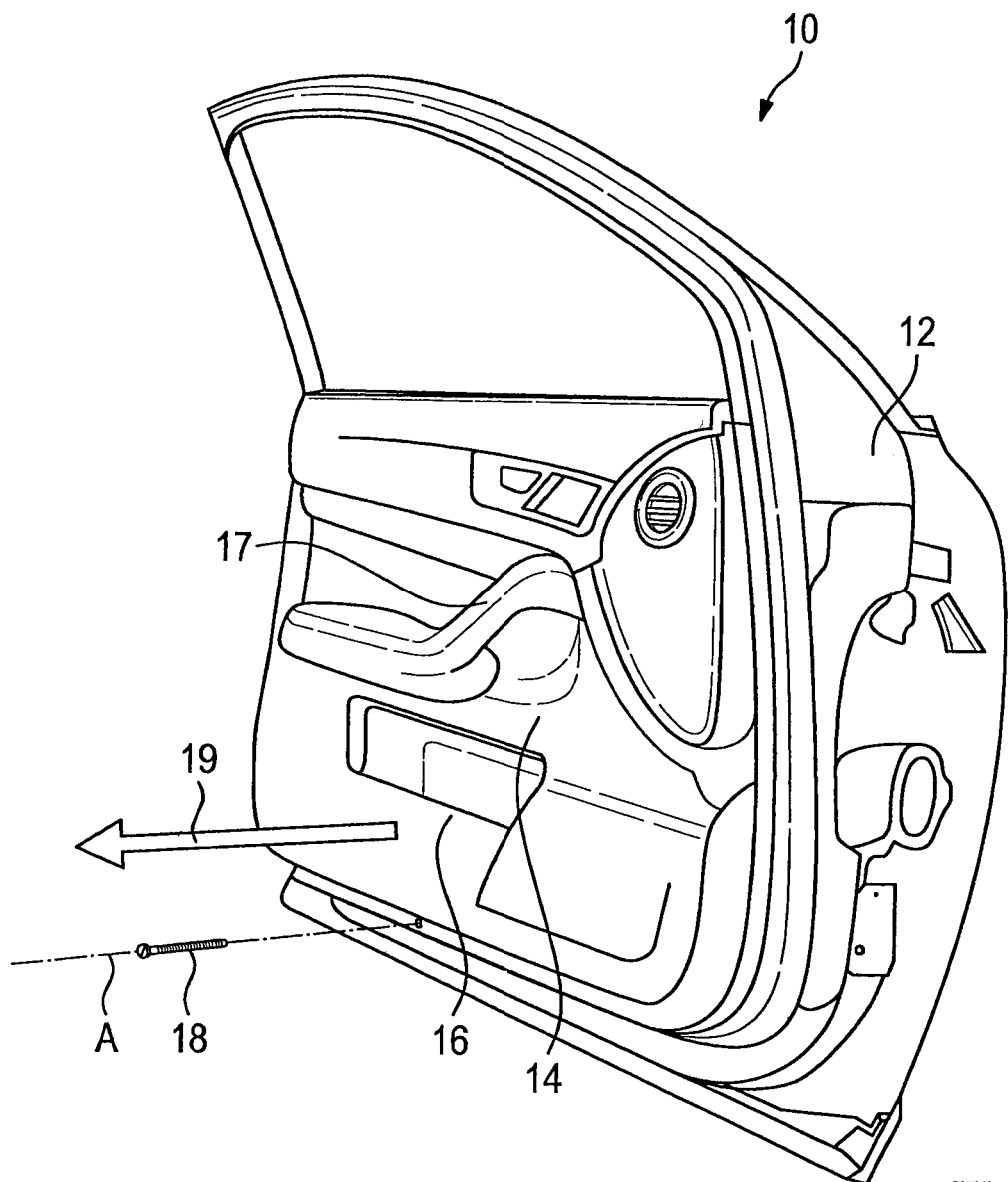
FIG. 1 shows the perspective view of a vehicle door.

FIG. 1 shows a vehicle door 10 having a lining support 12 and a vehicle inner lining 14. In the present case, the lining support 12 is a door metal sheet, a module support or a stiffening strut of the vehicle door 10; alternatively, it can however be a piece of the vehicle body, which is to be lined. In the embodiment according to FIG. 1, the vehicle inner lining 14 is a door lining 14 including, among other things, a storage compartment 16 for storing smaller objects such as a parking disk, an ice scraper, maps or the like. Since this storage compartment 16 can also be used in an improper way to close the door (cf. arrow 19) instead of using a door handle 17 of the vehicle door 10, the door lining 14 must be reliably fastened to the lining support 12 so that it is not detached from the lining support 12 when the vehicle door 10 is closed.

In order to prevent such an unintended demounting of the door lining 14, a locking screw 18 is usually provided in the prior art, which is screwed through the door lining 14 into the lining support 12.

Figure 2:
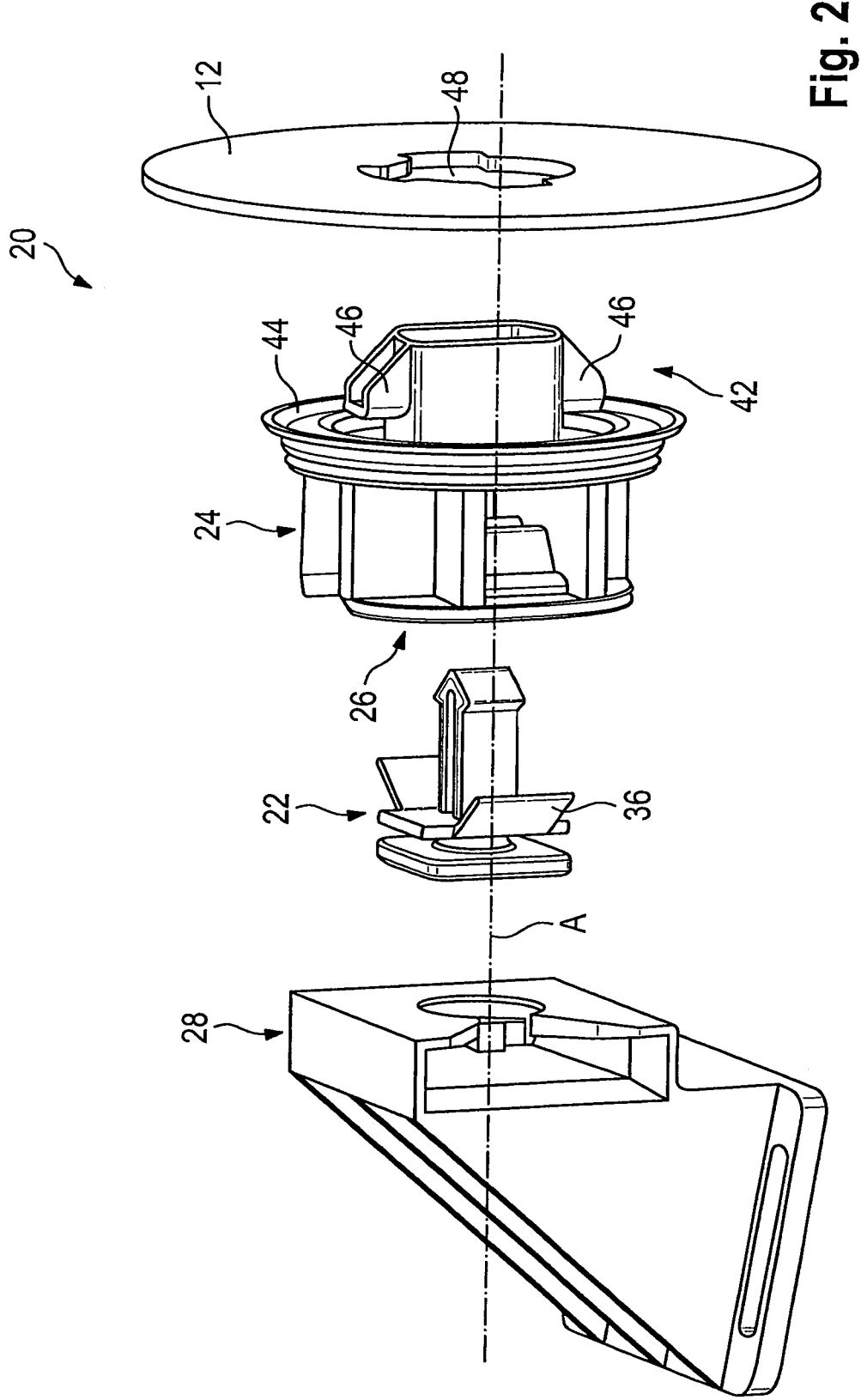
FIG. 2 shows the perspective exploded view of a device according to the invention for fastening a vehicle inner lining to a lining support.

FIG. 2 shows a device 20 for fastening the door lining 14 to the lining support 12. When using one or more of these fastening devices 20, it is possible to dispense with the optically disturbing locking screw 18 of FIG. 1. Here, the fastening device 20 is generally used in addition to conventional latching elements (not shown) which are distributed over the lining support 12 and the door lining 14 so that the door lining 14 can be simply clipped into the lining support 12 by a movement in the axial direction A. In this context, a direction perpendicular to the door plane, which corresponds in FIG. 1 approximately to a longitudinal direction of the locking screw 18, is referred to as an axial direction A. The fastening device 20 is preferably used in the region of large axial extraction forces at the edge of the door lining 14, i.e. in particular in the region of the locking screw 18 (cf. FIG. 1).

According to FIG. 2, the fastening device 20 comprises a holding element 22 and a receiving element 24, the receiving element 24 having a latching portion 26 into which the holding element 22 can engage such that it is fastened to the receiving element 24 in the axial direction. In addition to the holding element 22 and the receiving element 24, FIG. 2 also shows a detail of the lining support 12 and a fastening part 28 which serves to fasten the holding element 22 to the door lining 14.

Details of the specified components are now described more precisely below with reference to FIGS. 3 to 5.

FIG. 3 shows the fastening part 28 for fixing the holding element 22 to the door lining 14 (see also FIG. 9), the fastening part 28 being directly integrated into the door lining 14 in a particular variant.

FIG. 4 shows on the left a perspective view and on the right a lateral view of the holding element 22. The holding element 22 generally has the shape of a pin and includes two latching noses 30 at an axial end. At the opposed axial end, the holding element 22 has a rectangular pin head 32 which serves to fasten the holding element 22 to the fastening part 28. The holding element 22 is provided with two elastic wings 36 which are separated from the pin head 32 merely by a short neck portion 34 and the free ends of which rest against the receiving element 24 in the mounted state of the fastening device 20. The fastening device 20 is elastically prestressed by means of these wings 36 so that no rattling can occur later in the operation of the vehicle.

FIG. 5 shows on the left a perspective view and on the right a top view of the receiving element 24. The latching portion 26 of the receiving element 24 has an undercut 38 which can be engaged by the holding element 22, more precisely by a latching nose 30 of the holding element 22. In the embodiment illustrated, even two symmetrically arranged undercuts 38 are provided (FIG. 5, on the right), which are each formed by an obliquely positioned latching projection 40. The latching projections 40 are here configured so as to be elastic so that they are pushed apart by the holding element 22 upon axial mounting of the door lining 14, and snap back into their initial position behind the latching noses 30. Therefore, the axial extraction resistance between the holding element 22 and the receiving element 24 is substantially determined by the shaping of the latching noses 30 and the latching projections 40.

Furthermore, FIG. 5 clearly shows that the latching portion 26 is open laterally, i.e. transversally to the axis A, in particular radially to the axis A (see also FIGS. 2 and 4). For a demounting of the door lining 14, i.e. a detachment of the holding element 22 from the receiving element 24, a new deformation of the latching projections 40 is not necessary after the latching projections 40 have snapped back. The holding element 22 can be shifted laterally in the latching portion 26 such that it can move out of the latching portion laterally, in particular in a radial direction with respect to the axial direction. According to the right part of FIG. 5, the holding element 22 is shifted radially upwards relative to the receiving element 24 until the latching noses 30 no longer engage the latching projections 40.

Figure 6C:
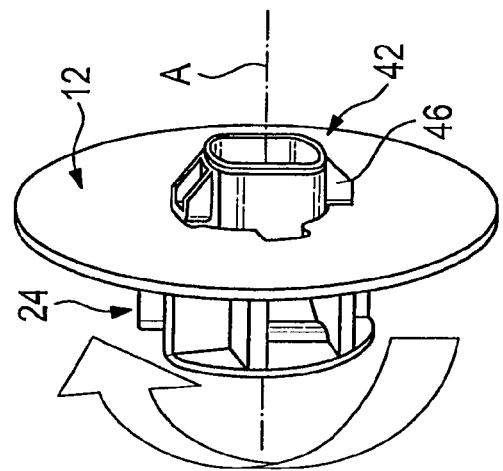
FIG. 6 shows the pre-mounting of the receiving element according to FIG. 5 to a lining support.

The receiving element 24 is preferably pre-mounted to the lining support 12. FIG. 6 shows a sequence scheme for pre-mounting the receiving element 24. The receiving element 24 comprises an anchoring portion 42 by means of which it can be mounted to the lining support 12 in a vehicle-fixed manner. The receiving element 24 is further provided with a seal 44 in order to seal a receiving space in the vehicle door 10 between the lining support 12 and the door lining 14 with respect to a vehicle environment.

Figure 6B:
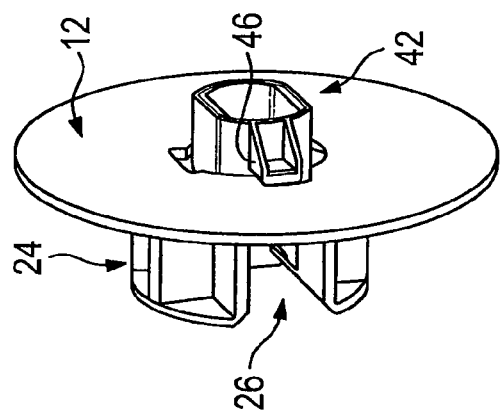
Figure 6A:
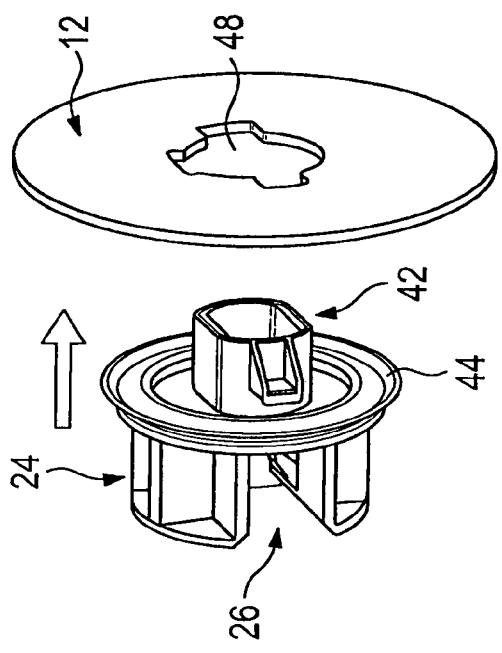

To pre-mount the receiving element 24 to the lining support 12, the anchoring portion 42, more precisely two anchoring projections 46 of the anchoring portion 42 that are located opposite each other, are moved in the axial direction through an opening 48 in the lining support 12 (see FIG. 6a). The anchoring portion 42 is configured such that the anchoring projections 46 pass completely through the opening 48 under axial deformation of the seal 44 (FIG. 6b). In this position, the receiving element 24 can be rotated about the axis A relative to the lining support 12. According to FIG. 6c, the receiving element 24 has been rotated through approximately 90°. The opening 48 in the lining support 12 has a cross-section which after this rotation does not permit any axial movement of the receiving element 24 against its direction of mounting. Due to the elastic deformation of the seal 44, the lining support 12 and the receiving element 24 are axially prestressed against each other and are connected with each other in the axial and in the radial direction. In other words, the receiving element 24 is fastened to the lining support 12 of the vehicle door 10 by means of a bayonet connection. In its final position according to FIG. 6c, this bayonet connection can of course have a rotation stop or a little latching means to exactly define the final position.

Figure 7A:
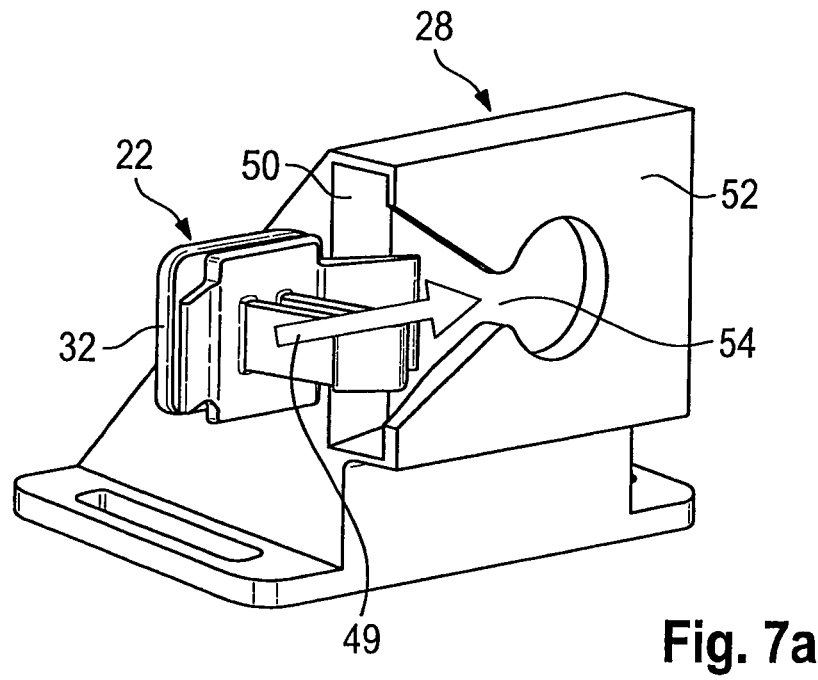
FIG. 7 shows the pre-mounting of the holding element according to FIG. 4 to a fastening part according to FIG. 3.
Figure 7B:
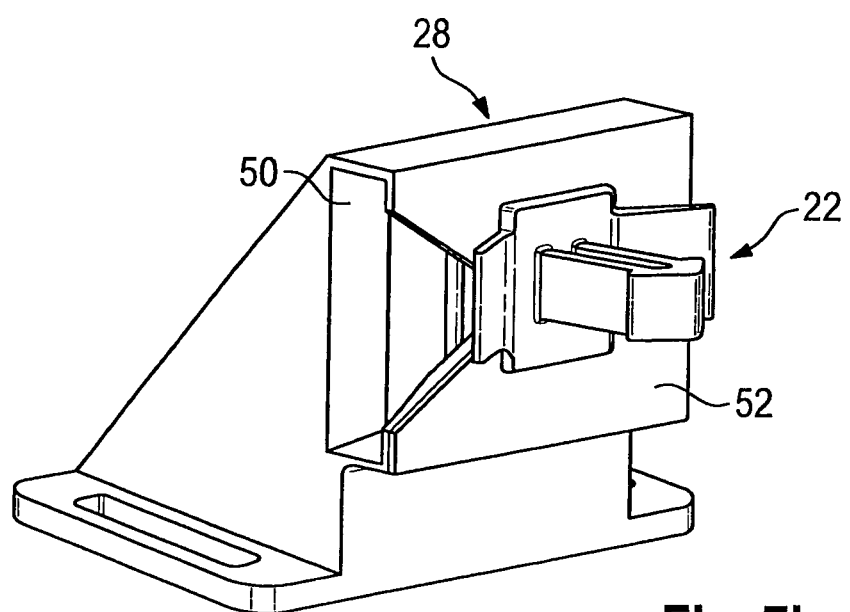

Before its mounting to the receiving element 24, the holding element 22 is also pre-mounted to the fastening part 28, more specifically by means of a sliding-latching connection, the fastening part being in turn attached to the door lining 14. For this purpose, according to FIG. 7a, the holding element 22 is moved radially onto the fastening part 28 (arrow 49), whereby the pin head 32 of the holding element 22 is received in a rectangular receiving pocket 50 which has an end wall 52 having a slot 54 in the form of a keyhole. At the narrowest point, a slot width is preferably smaller than a dimension of the neck portion 34 so that the holding element 22 snaps into its final position according to FIG. 7b and is captively fixed with respect to the fastening part 28. Though the ratio of sizes in FIGS. 7a and 7b is illustrated in a slightly distorted way, the inner dimensions of the receiving pocket 50 correspond approximately to the dimensions of the pin head 32 so that no relative rotation about the axis A is possible. With respect to the axis A, the holding element 22 is connected to the fastening part 28 for joint rotation therewith.

Figure 8A:
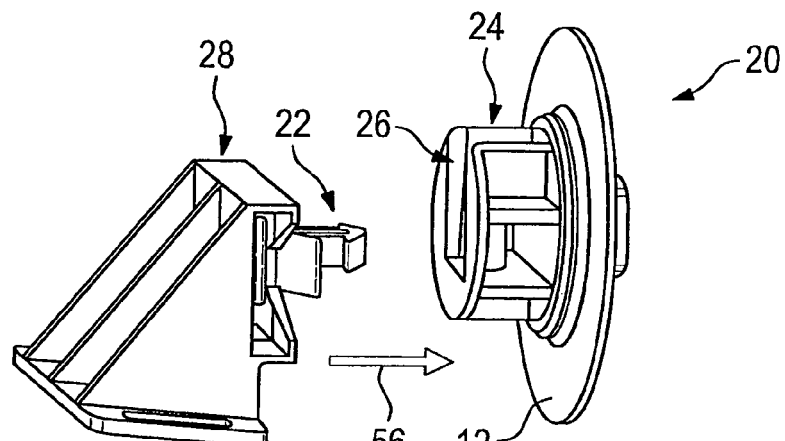
FIG. 8 shows the mounting and demounting of the fastening device according to the invention.
Figure 8B:
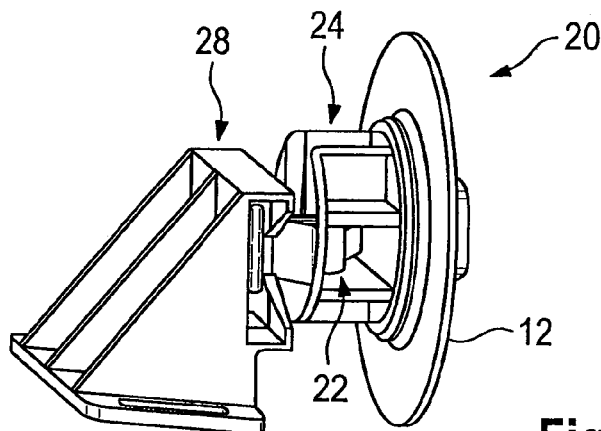

After the pre-mounting of the receiving element 24 to the lining support 12 and of the holding element 22 to the fastening part 28 or door lining 14, the door lining 14 can now be mounted to the lining support 12. For this purpose, according to FIG. 8a, the door lining 14 or the fastening part 28 rigidly connected with the door lining 14 is merely moved in the axial direction (arrow 56) towards the lining support 12. The holding element 22 of the fastening device 20 then latches into the latching portion 26 of the receiving element 24 under deformation of the latching projections 40 and of the elastic wings 36, so that the mounting substantially corresponds to a conventional mounting of the door lining 14 using conventional latching elements. This mounted latched position is shown in FIG. 8b.

Figure 8C:
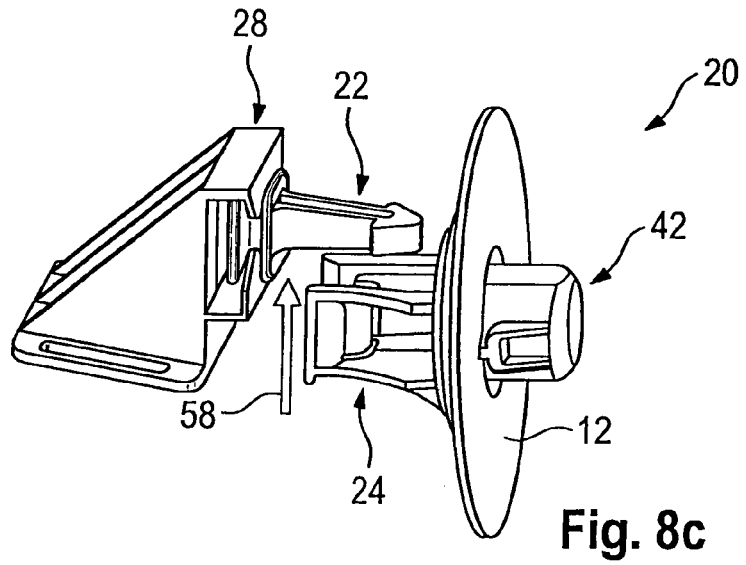

In contrast to conventional demounting methods, this latching connection is not released by an axial tensile force against the mounting direction upon demounting of the door lining 14, but rather by a lateral, in particular approximately radial shifting of the holding element 22 relative to the receiving element 24 (arrow 58). Since the latching portion 26 in the receiving element 24 is open laterally, the holding element 22 can move out of the receiving element 24 in a lateral direction, whereby the latching connection between the holding element 22 and the receiving element 24 is released (see FIG. 8c).

Figure 9A:
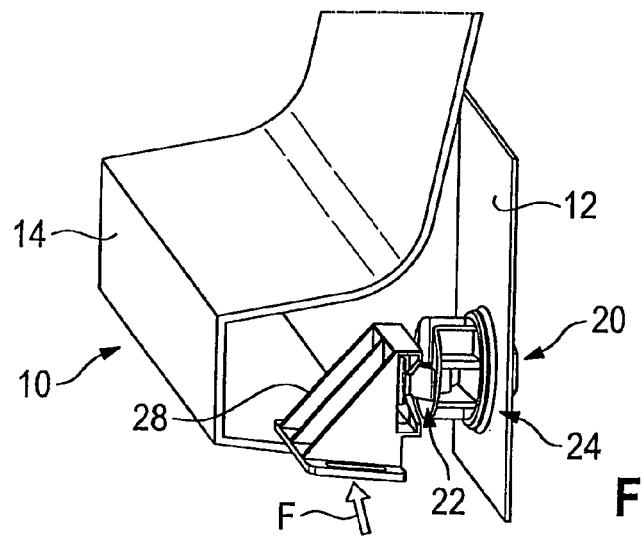
FIG. 9 shows the demounting of the vehicle inner lining from the lining support.
Figure 9B:
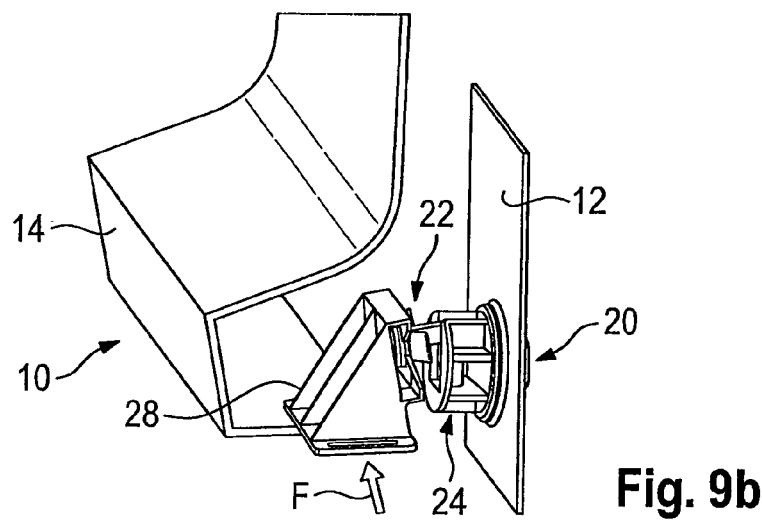
Figure 9C:
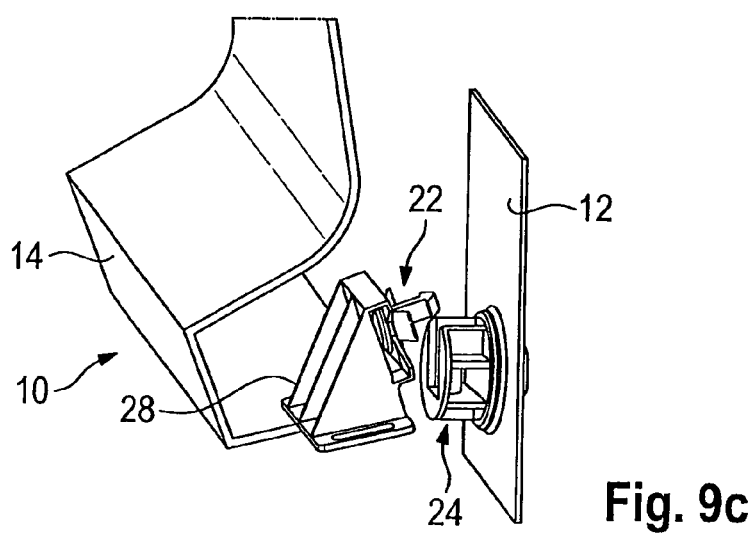

The demounting procedure is described again in more detail with reference to FIGS. 9a to 9c using the example of the vehicle door 10 according to FIG. 1. The fastening device 20 is provided instead of the locking screw 18, but approximately in the region thereof. FIGS. 9a to 9c show a schematic cross-section through the vehicle door 10 and this fastening device 20.

According to FIG. 9a, the door lining 14 is in its mounted position relative to the lining support 12, in which it has a high axial extraction resistance. At the edge of the door lining 14, the fastening part 28 is rigidly connected with the door lining 14 and even integrated into the door lining 14.

If it is now intended to demount the door lining 14 from the lining support 12, an approximately radially oriented force F has to be applied in the region of the fastening part 28.

Owing to this force F, the edge of the door lining 14 is deformed elastically (FIG. 9b). As a result of this deformation, the fastening part 28 and the holding element 22 fixed thereto perform a movement in an approximately radial direction so that the holding element 22 can move laterally out of the latching portion 26 of the receiving element 24 (FIG. 9c).

After the release of the latching connection(s) of the fastening device(s) 20, the door lining 14 is moved in the axial direction away from the lining support 12, whereby, optionally, further latching connections having conventional latching elements are released. In fact, the conventional latching elements form a latching connection upon the axial mounting movement, which is released again in case of an opposite axial demounting movement.

Therefore, the fastening device 20 generally permits a fastening of the door lining 14 to the lining support 12, this fastening being particularly impervious to water and dust, having a high extraction resistance and further permitting a repeated mounting and demounting for an approximately constant connection quality. Furthermore, the method of mounting and demounting the door lining 14 proves to be particularly simple when using the fastening device 20.

The invention claimed is:

1. A device for fastening a vehicle inner lining (14) to a lining support (12), having
a holding element (22) including two opposed elastic wings (36) with free ends, and
a receiving element (24),
the receiving element (24) including a latching portion (26) into which the holding element (22) can engage such that the holding element (22) is fastened to the receiving element (24) in an axial direction, the free ends of the elastic wings (36) engaging the receiving element (24) and elastically prestressing the holding element (22) in the axial direction when the holding element (22) is fastened to the receiving element (24),
wherein the latching portion (26) is open laterally.

2. The device according to claim 1, wherein the holding element (22) can be shifted laterally in the latching portion (26) so that it can move laterally out of the latching portion (26), in particular in a radial direction with respect to the axial direction.

3. The device according to claim 1, wherein the latching portion (26) has an undercut (38) which can be engaged by the holding element (22).

4. The device according to claim 3, wherein the undercut (38) is formed by an obliquely positioned latching projection (40).

5. The device according to claim 3, wherein the latching portion (26) has two symmetrically arranged undercuts (38).

6. The device according to claim 1, wherein the holding element (22) is formed so as to have the shape of a pin having at least one latching nose (30).

7. The device according to claim 1, wherein the receiving element (24) is provided with an anchoring portion (42) by means of which it can be mounted in a vehicle-fixed manner.

8. The device according to claim 7, wherein the anchoring portion (42) has two anchoring projections (46) located opposite each other.

9. The device according to claim 1, wherein the receiving element (24) is provided with a seal (44).

10. The device according to claim 1, wherein a fastening part (28) is provided which serves to fasten the holding element (22) to the vehicle inner lining (14).

11. The device according to claim 10, wherein the fastening part (28) is integrated into the vehicle inner lining (14).

12. The device according to claim 10, wherein the holding element (22) and the fastening part (28) are fastened to each other by means of a sliding-latching connection.

13. The device according to claim 1, wherein the latching portion (26) is open laterally such that the holding element

(22) is movable in a radial direction perpendicular to the axial direction to remove the holding element (22) from the latching portion (26).

14. A device for fastening a vehicle inner lining (14) to a lining support (12) comprising:
   a holding element (22); and
   a receiving element (24) having a seal (44) arranged on a side of the receiving element (24) facing the lining support (12),
   the receiving element (24) including a latching portion (26) into which the holding element (22) is engageable such that the holding element (22) is fastened to the receiving element (24) in an axial direction, the receiving element (24) having a pre-mount condition secured to the lining support (12) in which the seal (44) is axially deformed to bias the receiving element (24) against the lining support (12),
   wherein the latching portion (26) is open laterally.

15. The device according to claim 14, wherein the latching portion (26) is open laterally such that the holding element (22) is movable in a radial direction perpendicular to the axial direction to remove the holding element (22) from the latching portion (26).

16. A device for fastening a vehicle inner lining (14) to a lining support (12) comprising:
   a holding element (22) for connection to the vehicle inner lining (14);
   and
   a receiving element (24) for connection to the lining support (12) and having a latching portion (26), the holding element (22) being movable in an axial direction towards the lining support (12) into the receiving element (24) to secure the holding element (22) within the latching portion (26), the latching portion (26) being open laterally such that the holding element (22) moving in a radial direction perpendicular to the axial direction to remove the holding element (22) from the latching portion (26).

* * * * *